H. BROCK.
VELOCIPEDE OR FOUR WHEELED VEHICLE.
APPLICATION FILED FEB. 17, 1911.
1,018,405.
Patented Feb. 27, 1912.
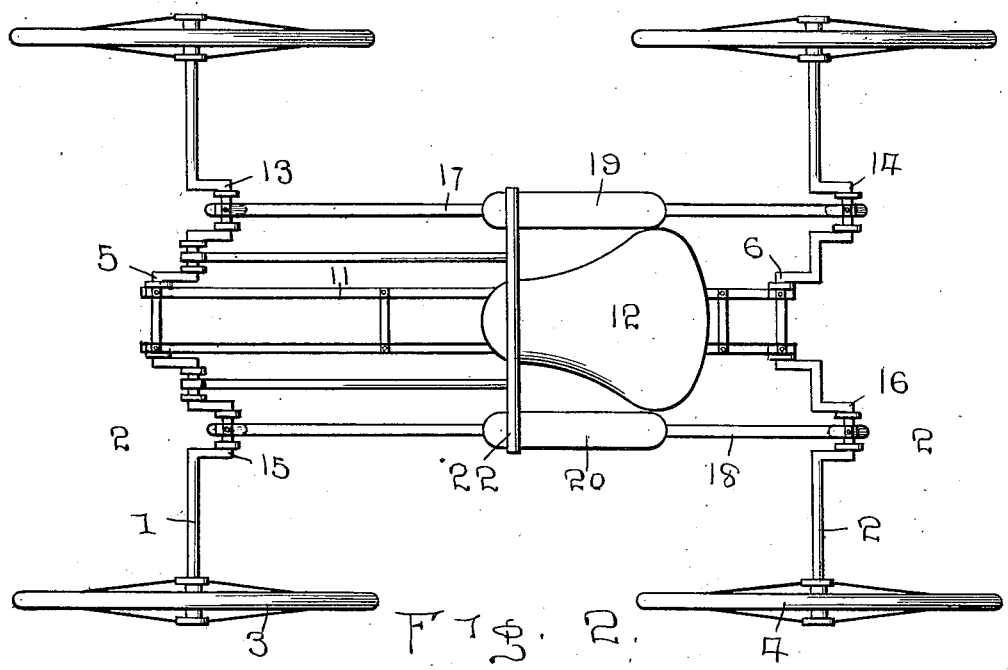
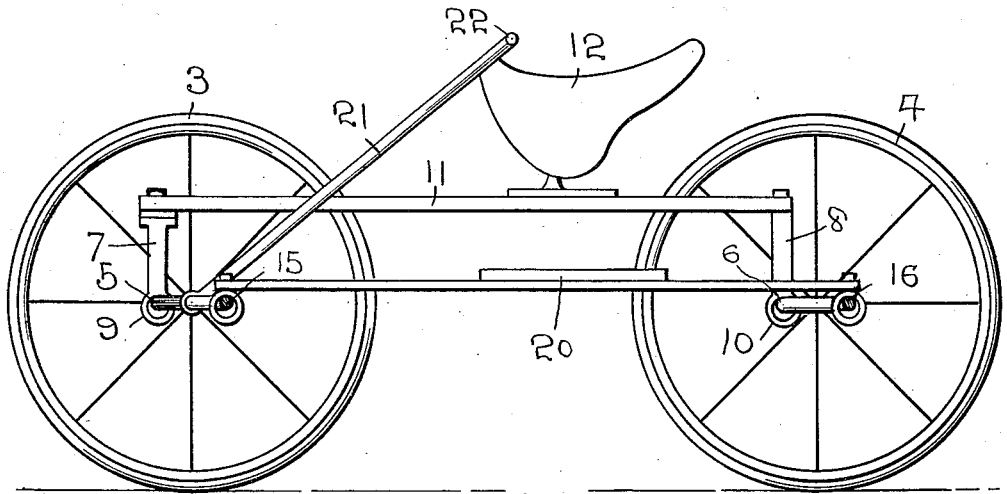
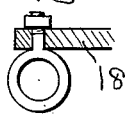
WITNESSES:
INVENTOR
H. Brock
BY
W. J. Fitzgerald
Attorneys

UNITED STATES PATENT OFFICE.

HENRY BROCK, OF GILLESPIE, ILLINOIS.

VELOCIPEDE OR FOUR-WHEELED VEHICLE.

1,018,405.  Specification of Letters Patent.  Patented Feb. 27, 1912.

Application filed February 17, 1911. Serial No. 609,158.

*To all whom it may concern:*

Be it known that I, HENRY BROCK, citizen of the United States, residing at Gillespie, in the county of Macoupin and State of Illinois, have invented certain new and useful Improvements in Velocipedes or Four-Wheeled Vehicles; and I do hereby declare the following to be a full, clear, and exact description of the invention, such as will enable others skilled in the art to which it appertains to make and use the same.

My invention relates to new and useful improvements in velocipedes or four wheeled vehicles and my object is to provide means for propelling the same by the weight of the operator.

A further object is to provide means for applying the weight of the body alternately with the pressure of the feet of the operator for propelling the vehicle, and, a further object is to provide means for guiding the vehicle.

Other objects and advantages will be hereinafter set forth and pointed out in the specification.

In the accompanying drawings, which are made a part of this application, Figure 1 is a top plan view of the velocipede, Fig. 2 is a sectional view thereof as seen on line 2, Fig. 1, and Fig. 3 is a detail of a portion of the device.

Referring to the drawings in which similar reference numerals designate corresponding parts throughout the several views, 1 and 2 indicate the forward and rear axles respectively of the vehicle to the ends of which are attached supporting wheels 3 and 4 respectively, the wheels being fixed to the axles so as to rotate therewith. Each axle is provided with a central crank portion 5 and 6 to which are connected standards 7 and 8, the lower ends of the standards having eyes 9 and 10 which surround a portion of said cranks and the openings in said eyes are of greater diameter than the diameter of the cranks so as to give a loose connection therebetween. Attached to the upper ends of the standards are the bars 11, upon which is mounted a seat 12 for the reception of the occupant of the vehicle. At each side of each central crank are auxiliary cranks 13 and 14 and 15 and 16, which auxiliary cranks are connected respectively by rods 17 and 18, the rod 17 connecting the auxiliary cranks 13 and 14 and the rod 18, the two cranks at the opposite sides of the central crank.

The trend of the auxiliary cranks is directly opposed to the direction of the central cranks so that when the central cranks are in their lowermost position, the auxiliary cranks will be in their elevated position and by placing tread plates 19 and 20 on the rods 17 and 18, downward pressure may be applied on the rods by the feet of the operator and the weight of the body lifted from the seat, while as soon as the seat has moved to its highest position, the weight of the body is placed thereon, which in view of the position of the central cranks will continue the rotation of the axles and again raise the auxiliary cranks and by alternately directing the weight of the body on the seat and tread plate the vehicle will be propelled.

Attached to the forward axle between the central and auxiliary cranks is a frame 21, the upper end of which has a cross bar 22 so that said cross bar can be readily grasped to guide the vehicle and although none of the parts of the vehicle or of the propelling means are pivoted to the forward axle, yet in view of the loose connection of the ends of the bar 11 and the ends of the rods 17 and 18 with the axles, the forward axle may be swung a sufficient distance to properly change the course and guide the vehicle.

By arranging the two rods and the bars to ascend and descend alternately, a movement is obtained similar to that experienced when riding a horse and the momentum given by the weight of the body and the movement of the vehicle will be sufficient to move the cranks beyond the center of gravity at each half revolution.

What I claim is:

The combination with a pair of axles having wheels upon their opposite ends, each having a central crank portion and auxiliary cranks at opposite sides of the central crank and directed oppositely thereto, said cranks being inwardly of the wheels, of rods extending from the auxiliary crank of one axle to the corresponding auxiliary crank of the opposite axle and loosely connected to said axles, standards loosely connected to the central cranks, bars attached to the upper ends of the standards, a seat on the bars whereby the weight of the body may be directed on the bars to lower the central cranks, tread plates on the rods whereby the weight of the body may be directed thereon to lower the auxiliary cranks and means to shift the forward axle in its bearings.

In testimony whereof I have signed my name to this specification in the presence of subscribing witnesses.

HENRY BROCK.

Witnesses:
 HERMANN SPRINGER,
 HENRY KATZMARLK,
 JOHN F. AHRENS.